US010563308B2

(12) United States Patent
Golobic et al.

(10) Patent No.: US 10,563,308 B2
(45) Date of Patent: Feb. 18, 2020

(54) METAL-CONTAINING PHOTOPOLYMER RESINS GENERATED BY REDUCTION OF DISSOLVED METAL SALTS

(71) Applicant: Lawrence Livermore National Security, LLC, Livermore, CA (US)

(72) Inventors: Alexandra Golobic, Pleasanton, CA (US); Eric Duoss, Dublin, CA (US); Julie A. Jackson, Livermore, CA (US); Andrew Pascall, Livermore, CA (US)

(73) Assignee: Lawrence Livermore National Security, Livermore, CA (US)

( * ) Notice: Subject to any disclaimer, the term of this patent is extended or adjusted under 35 U.S.C. 154(b) by 415 days.

(21) Appl. No.: 15/208,494

(22) Filed: Jul. 12, 2016

(65) Prior Publication Data

US 2018/0016680 A1 Jan. 18, 2018

(51) Int. Cl.
*C23C 18/31* (2006.01)
*C08K 3/08* (2006.01)
*C23C 18/16* (2006.01)

(52) U.S. Cl.
CPC .......... *C23C 18/31* (2013.01); *C23C 18/1612* (2013.01); *C08K 3/08* (2013.01); *C08K 2003/085* (2013.01); *C08K 2003/0806* (2013.01); *C08K 2003/0831* (2013.01); *C08K 2003/0862* (2013.01)

(58) Field of Classification Search
CPC ........ C08K 3/08; C23C 18/1612; C23C 18/31
See application file for complete search history.

(56) References Cited

U.S. PATENT DOCUMENTS

| 4,985,116 A * | 1/1991 | Mettler | G03F 1/68 |
| | | | 156/212 |
| 6,303,278 B1 * | 10/2001 | Larsson | H05K 3/185 |
| | | | 430/315 |
| 9,555,583 B1 * | 1/2017 | Dirk | A61N 1/0551 |
| 2004/0127025 A1 * | 7/2004 | Crocker, Jr. | B82Y 10/00 |
| | | | 438/677 |
| 2005/0064711 A1 * | 3/2005 | Kliesch | C08J 7/065 |
| | | | 438/689 |

(Continued)

OTHER PUBLICATIONS

Wu et al., Nanotechnology 20 (2009) 285312 (Year: 2009).*

(Continued)

*Primary Examiner* — Liam J Heincer
(74) *Attorney, Agent, or Firm* — Zilka-Kotab (57) ABSTRACT

According to one embodiment, a three-dimensional structure includes: at least one photopolymer having at least one metal dispersed throughout at least portions of a bulk of the structure. The structure is characterized by features having a horizontal and/or vertical feature resolution in a range from several hundred nanometers to several hundred microns. The portions of the bulk throughout which metal is dispersed may optionally be selectively determined. In more embodiments, the structure may have electroless plated metal formed on surfaces thereof, alternatively or in addition to the metal dispersed throughout the bulk of the structure. The electroless plating may be achieved without the use of a surface activation bath. Corresponding methods for forming various embodiments of such three dimensional structures are also disclosed.

18 Claims, 6 Drawing Sheets

(56) References Cited

U.S. PATENT DOCUMENTS

| | | | | |
|---|---|---|---|---|
| 2005/0130397 | A1* | 6/2005 | Bentley | C23C 18/28 438/584 |
| 2009/0202850 | A1* | 8/2009 | Mori | C23C 18/14 428/461 |
| 2009/0317609 | A1* | 12/2009 | Simmons | C23C 18/1608 428/209 |
| 2011/0037035 | A1* | 2/2011 | Lee | B22F 1/0022 252/513 |
| 2013/0337241 | A1* | 12/2013 | Gong | C04B 41/009 428/209 |
| 2015/0253661 | A1* | 9/2015 | Shukla | G03F 7/0047 430/16 |
| 2015/0309473 | A1 | 10/2015 | Spadaccini et al. | |
| 2016/0091793 | A1* | 3/2016 | Brust | G03F 7/031 430/16 |
| 2016/0174370 | A1* | 6/2016 | Park | C08J 7/123 174/258 |
| 2016/0326284 | A1* | 11/2016 | Farrugia | G03G 9/08711 |
| 2016/0326652 | A1* | 11/2016 | Gong | C23C 18/1608 |
| 2016/0332145 | A1* | 11/2016 | Shukla | B01J 23/50 |
| 2016/0333482 | A1* | 11/2016 | Shukla | C23C 18/30 |
| 2017/0081530 | A1* | 3/2017 | Shukla | C08L 35/00 |
| 2017/0081765 | A1* | 3/2017 | Shukla | C09D 11/037 |

OTHER PUBLICATIONS

Wu, LQ. et al., "Preparation of a Palladium Composite Membrane by an Improved Electroless Plating Technique," Industrial and Engineering Chemistry Research, 2000, vol. 39, No. 2, pp. 342-348.

Borgarello, E. et al., "Light-Induced Reduction of Rhodium(III) and Palladium(II) on Titanium Dioxide Dispersions and the Selective Photochemical Separation and Recovery of Gold(III), Platinum(IV), and Rhodium(III) in Chloride Media," Inorganic Chemistry, Feb. 1986, vol. 25, No. 25, pp. 4499-4503.

Vu, Y. et al., "Polymer-protected palladium nanoparticles. Morphologies and catalytic selectivities," Colloid Polymer Science, 2004, vol. 282, No. 6, pp. 613-619.

Zheng, X. et al., "Ultralight, Ultrastiff, Mechanical Metamaterials," Science, Jun. 2014, vol. 344, Issue 6190, pp. 1373-1377.

U.S. Appl. No. 14/688,187, filed Apr. 16, 2015.

* cited by examiner

METAL-CONTAINING PHOTOPOLYMER RESINS GENERATED BY REDUCTION OF DISSOLVED METAL SALTS

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The presently disclosed inventive concepts relate to additive manufacturing and three-dimensional (3D) printing, and more particularly to forming structures that include multiple materials, especially polymers and metals, using additive manufacturing and 3D printing techniques.

BACKGROUND

Projection micro-stercolithography (PμSL) is a recently-developed technology that allows additive manufacture of three-dimensional structures in nearly any configuration, with precise control over feature size. For instance, formation of a structure characterized by features with a horizontal and/or vertical resolution on the order of several hundred nanometers to several hundred microns. Typically, a curable resin is placed in a reservoir, and the resin is selectively cured, e.g. via directing a laser or other light source to selectively expose portions of the resin, causing precursor materials in the resin to form a solid structure in the exposed regions, typically via a polymerization process.

The exposure may be performed in a layer-wise fashion, and one or more two-dimensional masks may be employed to facilitate the selective exposure. Accordingly, each layer may be formed using a different mask, and the three-dimensional structure may be formed by exposing a layer using a two-dimensional mask, moving a stage along a third dimension (e.g. depth) into the reservoir, and exposing another layer using the same or a different two-dimensional mask to form a new layer on top of the previously formed layer. The thickness of each layer depends upon the properties of the resin (e.g. the depth to which light exposure may penetrate and effectively cause precursors to transform) and the magnitude of the stage movement between layers. In various approaches, each layer may have a thickness in a range from about 500 nm to about 500 μm.

While PμSL conveys extremely advantageous control over the structural arrangement of the fabricated part, structures produced using PμSL are limited in that the precursor materials must include photo-reactive components that will transform into a corresponding solid part upon exposure to the light source. To date, PμSL is limited to photopolymer resins that are curable in the UV range. Accordingly, while PμSL provides remarkable control over the structure of the fabricated part, the compositions which may be used to accomplish such structures are very limited in scope. Moreover, conventional compositions are limited to a single material, i.e. the final structure consists of a single material.

Some applications have included post-processing to modify or functionalize the structures produced by PμSL, e.g. by plating the printed structure with a material of interest. However, these post-processing techniques only coat the surfaces of the printed structure, and add thickness to the structure. Accordingly, the bulk of the structure cannot include the materials of interest, and it is not possible to precisely control which surfaces of the structure are coated. Moreover, adding such materials to the surface of the structure disadvantageously reduces the resolution of features.

In applications where small feature size is important (e.g. formation of micro lattices, capillary structures, etc.) these limitations are a significant disadvantage, and in some cases prohibit the modification or functionalization of the structures altogether. Even where not prohibitive to modification or functionalization as a whole, a lack of precise control over the spatial distribution of the modification or functionalization prohibits the manufacture of customized components particularly suited for individual purposes for which conventionally-manufactured components are unsuitable.

Similar limitations have been encountered using other additive manufacturing techniques such as deposition modeling, continuous liquid interface production and binder printing.

Accordingly, it would be highly beneficial to provide materials and techniques for forming structures via PμSL and other additive manufacturing techniques that may include a broader range of compositions beyond photopolymer resins that are curable in the UV range to expand the applicability of PμSL and other additive manufacturing techniques to a wide range of fields and tasks.

SUMMARY

In one embodiment, a three-dimensional structure includes: at least one photopolymer having at least one metal dispersed throughout at least portions of a bulk of the structure. The structure is characterized by features having a horizontal and/or vertical feature resolution in a range from several hundred nanometers to several hundred microns.

In another embodiment, a method for forming a three-dimensional metallized structure includes: dissolving at least one metal salt in a resin comprising one or more photopolymers; curing portions of the resin to form a three-dimensional structure; and reducing metal ions within the three-dimensional structure to form the three-dimensional metallized structure. The metal is dispersed throughout a bulk of the three-dimensional metallized structure.

In yet another embodiment, a method for forming a three-dimensional structure having at least one metal plated thereon includes: dissolving at least one metal salt in a resin comprising one or more photopolymers; curing portions of the resin to form the three-dimensional structure; and electroless plating at least one metal directly onto surfaces of the three-dimensional structure. The electroless plating does not utilize a surface activation bath.

In still yet another embodiment, a method for forming a selectively metallized three-dimensional structure includes: dissolving at least one metal salt in a resin comprising one or more photopolymers; curing portions of the resin to form a three-dimensional structure; and selectively reducing metal ions to form metal in the three-dimensional structure.

Other aspects and embodiments of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, reference should be made to the following detailed description read in conjunction with the accompanying drawings.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

As also used herein, the term "about" when combined with a value refers to plus and minus 10% of the reference value. For example, a length of about 1 μm refers to a length of 1 μm±0.1 μm.

It must also be noted that, as used in the specification and the appended claims, the singular forms "a," "an" and "the" include plural referents unless otherwise specified.

The following description discloses several preferred embodiments of three-dimensional, additively manufactured, selectively metallized structures and/or related systems and methods of making the same.

In one general embodiment, a three-dimensional structure includes: at least one photopolymer having at least one metal dispersed throughout at least portions of a bulk of the structure. The structure is characterized by features having a horizontal and/or vertical feature resolution in a range from several hundred nanometers to several hundred microns.

In another general embodiment, a method for forming a three-dimensional metallized structure includes: dissolving at least one metal salt in a resin comprising one or more photopolymers; curing portions of the resin to form a three-dimensional structure; and reducing metal ions within the three-dimensional structure to form the three-dimensional metallized structure. The metal is dispersed throughout a bulk of the three-dimensional metallized structure.

In yet another general embodiment, a method for forming a three-dimensional structure having at least one metal plated thereon includes: dissolving at least one metal salt in a resin comprising one or more photopolymers; curing portions of the resin to form the three-dimensional structure; and electroless plating at least one metal directly onto surfaces of the three-dimensional structure. The electroless plating does not utilize a surface activation bath.

In still yet another general embodiment, a method for forming a selectively metallized three-dimensional structure includes: dissolving at least one metal salt in a resin comprising one or more photopolymers; curing portions of the resin to form a three-dimensional structure; and selectively reducing metal ions to form metal in the three-dimensional structure.

Figure 1A:
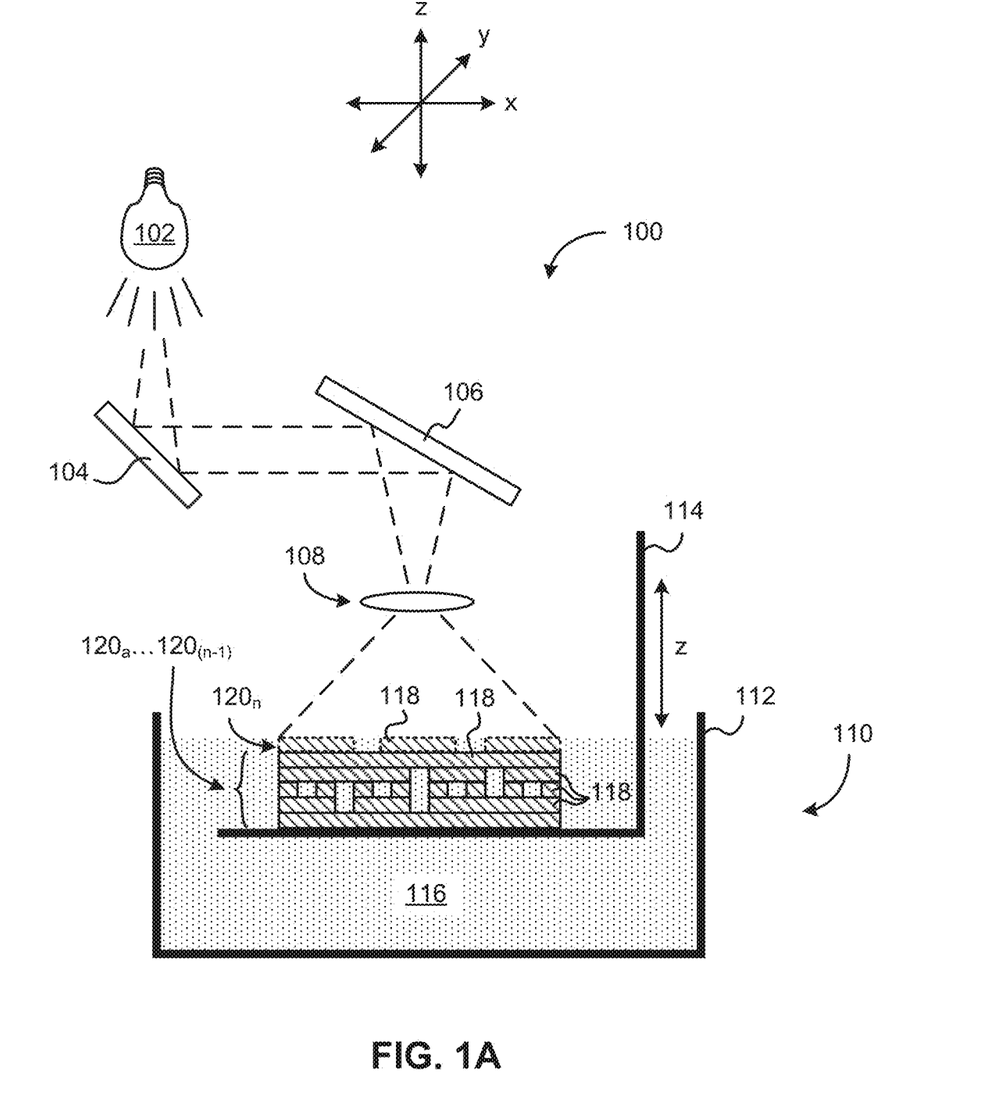
FIG. 1A is a simplified schematic of an exemplary conventional PμSL system.

Turning now to FIG. 1A, a simplified schematic of an exemplary apparatus 100 for performing photocatalytic additive manufacturing, such as PμSL, is shown according to one embodiment. The apparatus 100 generally includes a synthesis portion 110 comprising a reservoir 112 and a stage 114. The reservoir 112 may comprise any suitable materials and/or configuration that would be understood by a person having ordinary skill in the art, and should be characterized by dimensions suitable to allow the stage 114 to be contained within an inner volume of the reservoir 112. The stage 114 similarly may comprise any suitable materials and/or configuration, and preferably includes a flat lower portion upon which a product may be formed via additive manufacturing. In particularly preferred approaches, the stage 114 is configured to change position within the reservoir 112 along at least a z-axis, as shown in FIG. 1A. More preferably, the stage 114 may also be configured to change position within the reservoir 112 along an x and/or y axis. Alternatively, another mechanism may move the reservoir 112 along x, y and/or z axes while the stage 114 remains stationary.

The apparatus 100 further comprises an optics portion, which includes a light source 102, a digital mask 104, a mirror 106 (optional) and a projection lens 108. Each component of the optics portion is arranged to form a beam path from the light source 102 to the reservoir 112. Preferably, the light source is monochromatic, and emits a wavelength of light tuned to the photoinitiator band of the precursor 116, e.g. a photopolymer resin.

The digital mask 104 may include any suitable mask that would be understood by a person having ordinary skill in the art upon reading the present descriptions, and may in some approaches comprise an array of micromirrors configured to selectively reflect light (dashed lines) from the light source 102 toward the mirror 106 and/or projection lens 108, or away from the mirror 106 and/or projection lens 108. In other embodiments, the digital mask 104 may include a liquid crystal on silicon (LCoS) device.

The selectivity of the reflection may be defined based on a computer-generated digital pattern corresponding to a layer $120_a \ldots 120_n$ of a structure to be created using the apparatus 100. Accordingly, the apparatus 100 may be communicatively coupled to a computer or other suitable device and receive therefrom instructions regarding a particular pattern or series of patterns to utilize for selectively directing light from the light source 102 to the reservoir 112 as part of an additive manufacturing process.

Accordingly, in operation, apparatus 100 facilitates the manufacture of custom-designed structures with extreme precision, e.g. characterized by a feature size on the scale of $10^{-2}$-$10^3$ microns, in some embodiments. In various embodiments, features may be characterized by a feature size on the scale of 10 nm to several hundred (e.g. 200-500) nm, a feature size on the scale of several hundred nm to several hundred microns, a feature size on the scale of several hundred nm to several mm, etc., e.g. including embodiments in which the feature size may be in a range determined based on the type of formation process employed to fabricate the structures and as would be understood by a person having ordinary skill in the art upon reviewing the present disclosures.

As described herein, features should be understood to include any suitable component, portion. etc. of a three-dimensional structure, as would be understood by a person having ordinary skill in the art upon reading the present descriptions. For instance, in various embodiments, features may include protrusions, depressions, voids, lattices, channels, pockets, pillars, points, overhangs, cantilevers, positive features at various angles, etc. as skilled artisans will appreciate upon reviewing the instant disclosure. Generally, and due to the high level of precision afforded by PµSL, any of the foregoing features may be formed at nearly any angle.

To accomplish this result, a precursor 116 is placed in the reservoir 112, and the stage 114 is positioned within the reservoir 112 in such a manner that the lower portion of the stage 114 is submerged in the precursor 116 to a predetermined depth corresponding to a thickness of a layer $120a \ldots 120n$ of the structure to be fabricated.

The precursor 116 may include any suitable material, and preferably includes one or more photo-curable resins. In various approaches, the precursor 116 is preferably a liquid, optionally a viscous liquid, and may include one or more photopolymers, such as hexane diol diacrylate (HDDA), polyethylene glycol diacrylate (PEGDA), ethylene glycol dimethacrylate (EGDMA), epoxides, silicones, thiol-enes, and/or other suitable photopolymers for forming a solid structure via PµSL that would be understood by a person having ordinary skill in the art upon reading the present disclosure. Precursor 116 may be in the form of a solution, a mixture, etc. and may optionally include photoactive reduction inhibitor(s), photo reductant(s) and/or photoabsorber(s). In preferred approaches at least two of the foregoing optional compositions are included, and in particularly preferred embodiments at least the photoabsorber, which advantageously enhances feature resolution by decreasing the resin's sensitivity to light, is present.

The photo-curable resin(s) are characterized by forming solids, e.g. via crosslinking polymers in the precursor 116, in response to exposure of the precursor 116 to light (dashed lines) from the light source 102. Accordingly, it is possible to define a precise three-dimensional structure via a series of patterns to be applied via the digital mask 104 and selectively expose a predetermined thickness/depth of the precursor 116 to the light from light source 102 and form, layer-by-layer, regions 118 of solid material from the precursor 116.

As shown in FIG. 1A, the structure formed using the apparatus 100 thus includes a plurality of layers $120_a \ldots 120_n$ each formed according to a single exposure from the light source 102 and according to a pattern defined by the digital mask 104. In between formation of each layer $120_a \ldots 120_n$, the stage 114 is moved within the reservoir (and/or the reservoir 112 is moved relative to the stage 114) to facilitate formation of a subsequent layer on the previously formed layer. According to FIG. 1A, the structure is characterized by a plurality of layers $120_a \ldots 120_{(n-1)}$, and the apparatus 100 is in the process of forming a final layer $120_a$ on layer $120_{(n-1)}$ by exposing precursor 116 above layer $120_{(n-1)}$ to light from the light source 102. In response to the exposure, in the regions 118 to which the precursor 116 is exposed the photopolymer initiates a crosslinking process and solidifies in the corresponding regions 118 (shown by dashed line rectangles in layer $120_n$ of FIG. 1A).

Figure 2A:
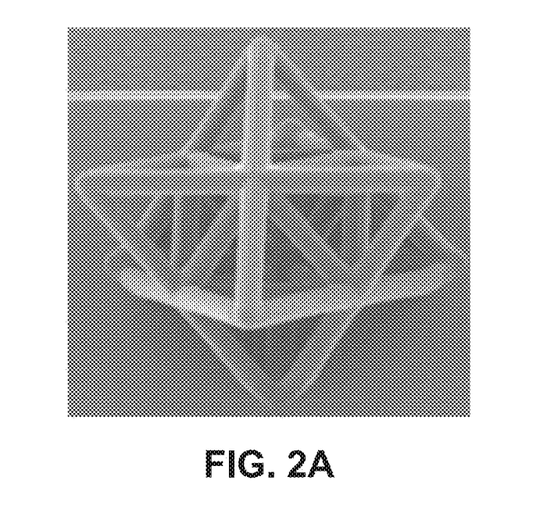
FIG. 2A is a scanning electron micrograph (SEM) of an exemplary conventional structure consisting of a first material and fabricated using PμSL, according to one embodiment.
Figure 2B:
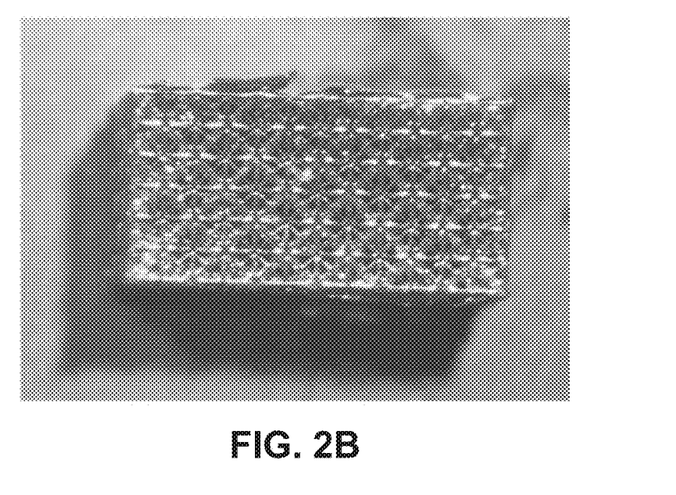
FIG. 2B is an image of an exemplary structure comprising a first material and a second material, which was fabricated using PμSL, according to one embodiment.

In the foregoing manner, extremely precise control over structural and positional arrangement of the resulting component is enabled. While the structure shown in FIG. 1A has a substantially rectangular, simple profile and arrangement of component portions, more complex structures such as shown in FIGS. 2A-2B are equally feasible, in various approaches.

The foregoing descriptions of an apparatus 100 as shown in FIG. 1A and a corresponding fabrication process should be understood as exemplary, nonlimiting illustrations of a suitable apparatus 100 and fabrication process suitable for use in the context of the presently disclosed inventive concepts. It will be appreciated by a person having ordinary skill in the art upon reading the present descriptions that other apparatuses and/or fabrication processes, particularly additive manufacturing and three-dimensional printing processes such as stereolithography, deposition modeling, continuous liquid interface production and binder printing may be employed without departing from the scope of the instant descriptions.

However, in preferred approaches an apparatus 100 as shown in FIG. 1A and PµSL manufacturing process are implemented to form materials comprising photopolymer resins with metal selectively included therein and/or thereon, which are generated by reduction of dissolved metal salts incorporated into the photopolymer resin during/via the fabrication process.

Accordingly, it should be appreciated that the presently disclosed inventive concepts represent a novel technique for generating selectively metallized structures via additive manufacturing and/or three-dimensional printing processes. The novel techniques result in novel structures with precise ability to control the portions of the structure which are metallized and the portions of the structure which are not metallized, as will be described in further detail below.

In one example, selectively metallized components can be fabricated by incorporating palladium chloride into the polymer resins used for 3D printing with projection microstereolithography. To date, 3D printing techniques have been limited in their ability to create multi-material parts, specifically parts incorporating metal features, which is key to many electronic designs. Similarly, other metals such as platinum, gold and silver can be reduced in a like manner. The incorporation of palladium salts, and results following reduction thereof, in parts manufactured using 3D printing and/or additive manufacturing techniques can be accomplished using one or more of three exemplary approaches: (1) using multi-material printing to introduce palladium loaded regions into a part, (2) using the palladium salt to electroless plate directly onto the surface of a part; where after the polymer may optionally be removed to create a hollow metal part; and (3) using different wavelengths of light to activate the reduction of the metal salt and the photopolymer during the fabrication process. All of these methods may be implemented to produce a selectively metallized part, and the particular method implemented in a given application may be selected based on the needs and restrictions of the specific application.

In one embodiment, palladium chloride is incorporated into the precursor bath, e.g. comprising a UV-curable resin, and a three-dimensional structure is fabricated using the projection microstereolithography apparatus as shown in FIG. 1A. During the printing process, the salt begins to reduce; this process continues once the printing is completed and is allowed to propagate through the part until fully reduced. The resulting part is a composite palladium and resin structure.

As a demonstration, 40 g/L of palladium chloride was dissolved in the photopolymer 1,6-Hexadianol diacrylate (HDDA), along with a photoinitiator whose peak absorbance is in the UV range (~395 nm). A structure was printed in the projection microstereolithography apparatus, where each layer was cured for 45 s with a UV light source running at 6 A. After printing, the part was allowed to sit in an ethanol bath overnight to remove any uncured polymer. The resulting part had a metallic surface finish, as shown in FIG. 2B. By incorporating multi-material printing techniques, sections of the structure can utilize this method while the rest of the structure is solely polymer.

Of course, other metal salts may be implemented in the context of the presently disclosed inventive concepts, such as nickel sulfate, silver nitrate, copper acetate, copper nitrate, and other salts of platinum, gold, palladium, or other metals as would be understood to be suitable by a skilled artisan upon reading the present disclosures.

Reduction of the metal salt in the precursor bath may occur naturally, and the mixing of precursor material and metal salt may be performed, after which the natural reduction process is allowed to proceed for a predetermined amount of time, e.g. 72-120 hours in one embodiment. The amount of time may be chosen as a function of the rate of the reduction process, so as to include a predetermined amount of the metal in the resulting structure. Following a desired amount of reduction, the printing process may be performed to form the structure having metal incorporated in the bulk and/or surfaces thereof. Alternatively, the structure may be printed immediately following mixing of the metal salt and precursor materials, and reduction may occur naturally or be facilitated thereafter.

In more approaches, the metal salt may also be reduced by other means, such as chemical reduction with ethanol, sodium hydroxide. etc. as would be understood by a person having ordinary skill in the art upon reading the present descriptions.

In more approaches, a metallized structure formed according to the foregoing technique may be utilized as a seed material for electroless plating of another metal, such as nickel, gold, platinum, etc. onto surfaces of the metallized structure. The amount of metal salt included in the precursor bath may be determined based on the application for which the metallized structure is intended, in order to tune the amount of metal in the structure appropriately. In various approaches, the amount of metal salt present in the precursor bath may be in a range from about 0.5 g/L to about 50 g/L, with 40 g/L being preferred, in approaches using palladium chloride and designed to form a metallized part with metal throughout the bulk of the structure.

In more embodiments, elevated temperature can be used to initialize the polymerization process, and polymerization, which includes interactions between radicals and the precursor materials (e.g. acrylates) may also facilitate reduction of the metal salt into metal.

The inventors discovered during development of the presently disclosed inventive concepts that, in some approaches the metal salt may unexpectedly function as a catalyst in the cross-linking of precursor materials to form the resulting structure.

Figure 3:
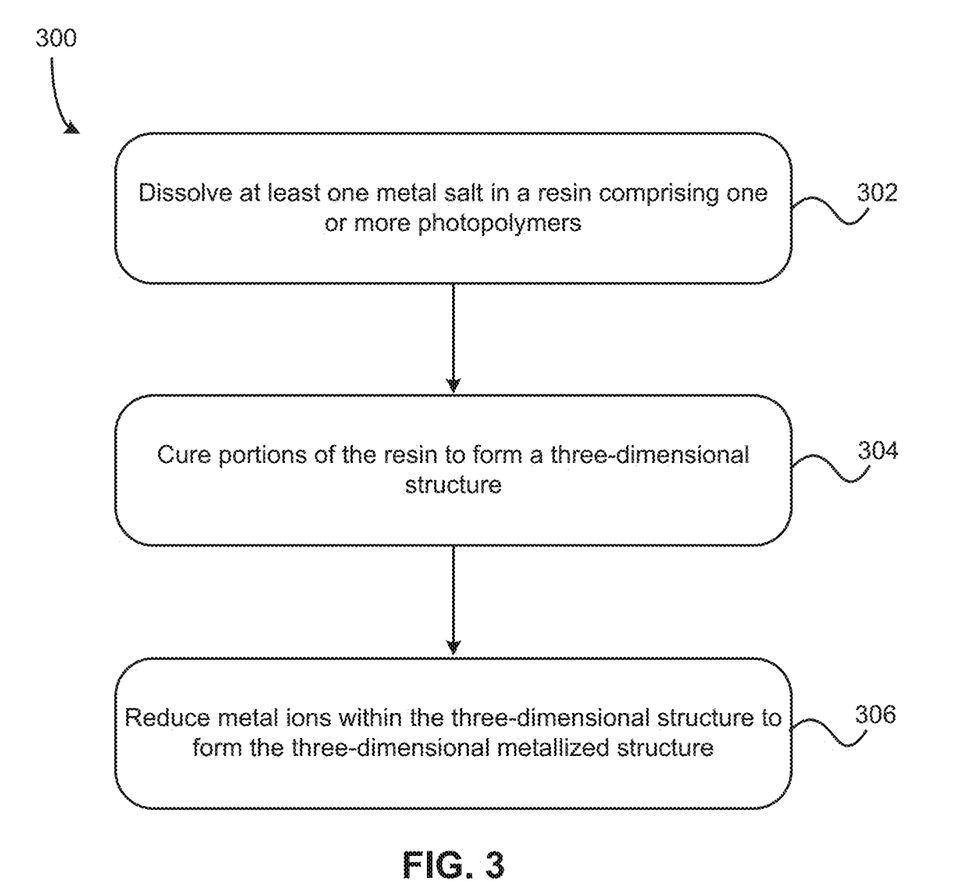
FIG. 3 is a flowchart of a method for forming a selectively metallized structure comprising a photopolymer resin and at least one metal, according to one embodiment.

Accordingly, in one embodiment, a fabrication process for forming a selectively metallized structure comprising a photopolymer resin and at least one metal as disclosed herein may proceed substantially as shown in FIG. 3 and according to method 300. The method 300 may be performed in any suitable environment, such as shown in FIG. 1A, or other environments suitable for the particular type of additive manufacturing or three-dimensional printing by which the structure is to be fabricated, and as would be understood by a person having ordinary skill in the art upon reading the present descriptions.

Method 300 includes operation 302, in which at least one metal salt is dissolved in a resin comprising one or more photopolymers.

In operation 304 of method 300, the resin is cured to form a three-dimensional structure, optionally by crosslinking the one or more photopolymers in the portions of the resin, e.g. in embodiments where projection microstereolithography is employed to form the structure. Where other approaches such as binder printing or multi-material printing are employed, polymers may or may not be crosslinked. Crosslinking may be achieved, for example, by exposing predefined portions of the resin to light having a particular wavelength at which the photopolymers react, the predefined portions being determined according to a digital mask or multiple digital masks.

Method 300 also includes operation 306, where metal ions in the three-dimensional structure are reduced. The resulting metal is dispersed throughout a bulk of the three-dimensional structure by virtue of the ions being solvated into the resin and the reduction being carried out to completion.

Of course, as will be understood by persons having ordinary skill in the art upon reading the present descriptions, method 300 may additionally and/or alternatively include any suitable materials, features or operations as described herein.

For instance, in one embodiment, the reducing operation includes at least one of chemical reduction and thermal reduction as described hereinabove.

In another embodiment, treating the three-dimensional structure in an ethanol bath may advantageously remove uncured polymer from the three-dimensional structure.

As noted above, the one or more photopolymers may include at least one of: hexane diol diacrylate (HDDA); polyethylene glycol diacrylate (PEGDA); thiol-ene; silicone; and an epoxide. Similarly, the metal may include one or more of: palladium, platinum, gold, nickel, copper, and silver.

In various embodiments, the bulk of the structure throughout which the metal is dispersed may form a continuous pathway defining a circuit, and the continuous pathway may be conductive accordingly.

The resin may be cured in a layer-wise iterative fashion, such that the structure comprises a plurality of layers of the crosslinked photopolymer, each layer having a thickness in a range from about 10 nm to about 5 mm. Of course, the thickness (as well as other features) may have dimensions in a range as discussed above, in various embodiments. The structure may also be characterized by features having a horizontal and/or vertical feature resolution in a range from several hundred nanometers to several hundred microns, or even feature sizes on a millimeter scale.

Moreover, multiple photopolymers and/or metals may be included in the structure, e.g. using multiple resins with different combinations of metal ions and photopolymers contained therein.

Figure 4:
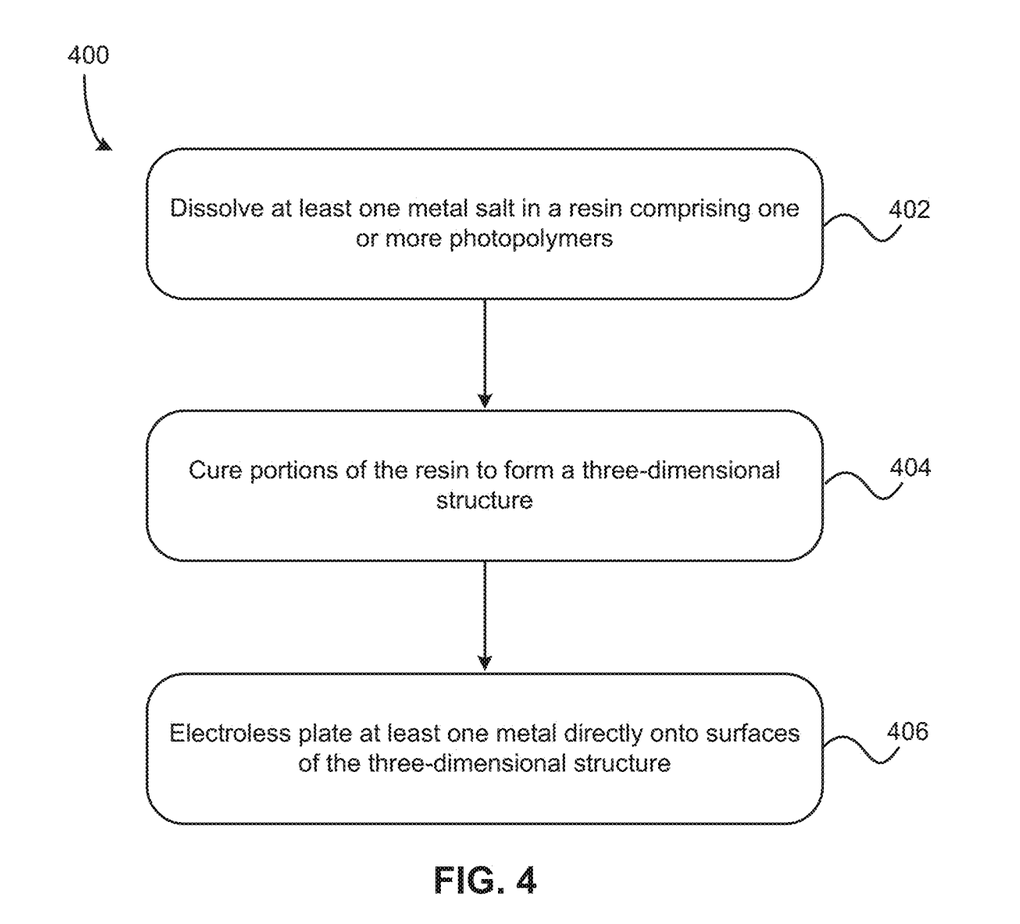
FIG. 4 is a flowchart of a method for electroless plating of a metal onto a three-dimensional structure without the need for a surface activation bath or separate surface activation step in the electroless plating process, according to another embodiment.

Turning now to FIG. 4 and method 400, in more embodiments the presently disclosed inventive concepts may be implemented to effect electroless plating of a metal onto a three-dimensional structure without the need for a surface activation bath or separate surface activation step in the electroless plating process. Rather, the presently disclosed inventive techniques, and particularly embodiments of method 400, enable direct electroless plating of metal(s) onto surfaces of a three-dimensional structure due to catalysts (e.g. appropriate metal ions) being incorporated directly into the surfaces of the three-dimensional structure during fabrication thereof.

The method 400 may be performed in any suitable environment, such as shown in FIG. 1A, or other environments suitable for the particular type of additive manufacturing or three-dimensional printing by which the structure is to be fabricated, and as would be understood by a person having ordinary skill in the art upon reading the present descriptions.

Method 400 includes operation 402, in which at least one metal salt is dissolved in a resin comprising one or more photopolymers.

In operation 404 of method 400, portions of the resin are cured to form a three-dimensional structure, optionally by crosslinking the one or more photopolymers in the portions of the resin, e.g. in embodiments where projection microstereolithography is employed to form the structure. Where other approaches such as binder printing or multi-material printing are employed, polymers may or may not be cross-linked. The dissolving and curing may be performed substantially as described above with regard to operations 302, 304 of method 300.

Method 400 also includes operation 406, where at least one metal is electrolessly plated directly onto surfaces of the three-dimensional structure. As noted above, the electroless plating does not utilize a surface activation bath or separate surface activation step, but instead utilizes metal ions incorporated into the cured portions of the resin as a catalyst for plating directly onto the structure.

Of course, as will be understood by persons having ordinary skill in the art upon reading the present descriptions, method 400 may additionally and/or alternatively include any suitable materials, features or operations as described herein.

For instance, in one approach the electroless plating comprises treating the three-dimensional structure in an electroless nickel bath. Preferably, the treatment is performed within a short window of time of completing the formation of the three-dimensional structure. The amount of time between forming the structure and performing the electroless plating is important since the metal ions incorporated into the structure may naturally undergo reduction over time, and the reduced metal may not be suitable for serving as a catalyst in the electroless plating process.

On the other hand, reduction of metal ions to metal may form a conductive surface, in which case electroplating techniques may be employed to deposit a metal onto surfaces of the structure, in alternative embodiments.

In more approaches, method 400 may be paired with multi-material printing techniques to produce a selectively plated structure. For instance, electroless plating may be performed in regions where reduction is inhibited, and electroplating may be performed in regions where reduction occurs. Moreover, multiple metals may be plated in such a manner.

In more embodiments, following plating of the metal(s) onto surfaces of the structure, the crosslinked polymers may be etched away using a suitable etching technique and solution as would be understood by those having ordinary skill in the art upon reading the present disclosures, resulting in a three-dimensional structure with hollow regions surrounded by metal deposited via electroplating and/or electroless plating.

In various approaches, and equally applicable to all fabrication methods disclosed herein, the resin may include a hydrogel ink to facilitate higher loading of the metal salts into the resin, which may advantageously improve the efficiency and degree of metallization accomplished using the presently disclosed inventive techniques.

The one or more photopolymers, in different embodiments, may include at least one of: hexane diol diacrylate (HDDA); polyethylene glycol diacrylate (PEGDA); elethylene glycol dimethacrylate (EGDMA); thiol-enes; silicones; epoxides; and combinations thereof.

In various embodiment, the metal ions may comprise palladium ions, gold ions, silver ions, platinum ions, nickel ions, or any other suitable ion for serving as a catalyst in an electroless plating process, as would be understood by a person having ordinary skill in the art upon reading the present disclosures. Meanwhile, the metal may include nickel, palladium, gold, silver, platinum, or any other suitable metal for electroless plating, as would be understood by a person having ordinary skill in the art upon reading the present disclosures.

Figure 5:
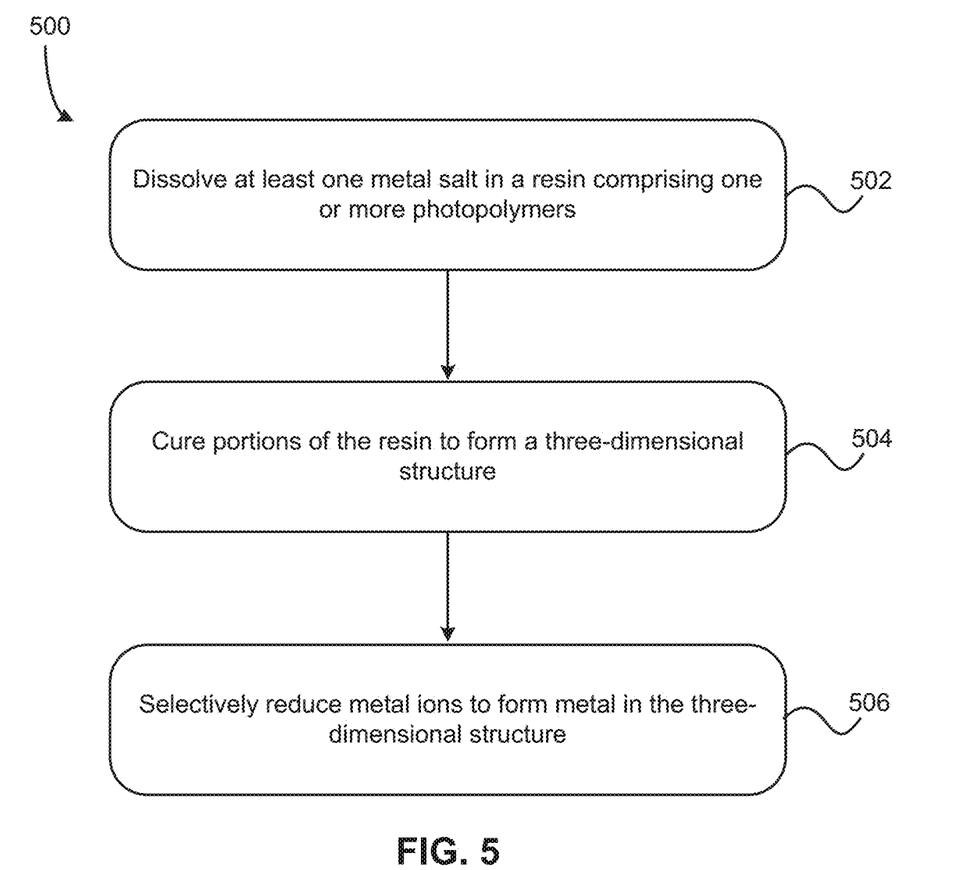
FIG. 5 is a flowchart of a method for forming a selectively metallized three-dimensional structure, according to yet another embodiment.

Turning now to FIG. 5, a method 500 for forming a selectively metallized three-dimensional structure is shown, according to one embodiment. The method 500 may be performed in any suitable environment, such as shown in FIG. 1A, or other environments suitable for the particular type of additive manufacturing or three-dimensional printing by which the structure is to be fabricated, and as would be understood by a person having ordinary skill in the art upon reading the present descriptions.

Method 500 includes operation 502, in which at least one metal salt is dissolved in a resin comprising one or more photopolymers.

In operation 504 of method 500, portions of the resin are cured to form a three-dimensional structure, optionally by crosslinking the one or more photopolymers in the portions of the resin, e.g. in embodiments where projection microstereolithography is employed to form the structure. Where other approaches such as binder printing or multi-material printing are employed, polymers may or may not be cross-linked. The dissolving and curing may be performed substantially as described above with regard to operations 302, 304 of method 300.

Method 500 also includes operation 506, where metal ions in the three-dimensional structure are selectively reduced to form metal in the three-dimensional structure. Selective reduction of metal ions may be accomplished, in preferred approaches, via use of a photoactive reduction inhibitor, and may involve selective inactivation of the inhibitor in conjunction with curing of the resin to metallize only select portions of the three-dimensional structure.

Of course, as will be understood by persons having ordinary skill in the art upon reading the present descriptions, method 500 may additionally and/or alternatively include any suitable materials, features or operations as described herein.

Accordingly, in one embodiment method 500 involves mixing the palladium chloride, or other metal salts, into the photopolymer as before, but now also incorporating a photoactive reduction inhibitor, such as a chelating agent, which only permits the reduction after exposure to a certain wavelength that is different than the wavelength that cures the resin. If it is desirable to print just polymer resin without metallization, then the polymer resin is only exposed to the wavelength of light that cures the polymer resin. The photoactive reduction inhibitor remains in place, so no reduction occurs. If it is desirable to print the metallized polymer, then the polymer resin is exposed to both the wavelength of light that cures the resin as well as the wavelength of light that deactivates the photoactive reduction inhibitor, causing the metal ion to reduce to metal. This allows for multi-material printing without changing the resin during printing.

Accordingly, method 500 represents a novel and advantageous improvement over existing techniques for coating an entire structure with an electroless process. In conventional techniques, it is not possible to selectively control the locations that are plated, since it is very difficult to control by masking off an area, and then doing the coating, which is conformal. Instead, conventional techniques essentially coat all exposed surfaces. This is especially for complex structures such as shown in FIGS. 2A and 2B. e.g. a truss like structure, or a lattice-like structure, respectively, which include internal components. Moreover, micro scale features, are not readily accessible for masking.

By contrast, the presently disclosed inventive process enables a selective metallization, and provides multi-material fabrication capability. For instance, in one approach the reservoir 112 may be replaced with a micro-fluid delivery system. In that micro-fluid delivery system, it is possible to flow a first resin onto the stage 114, and that resin may omit metal salts. The first resin may be cured as described herein to form a non-metalized material. Subsequent to curing, the first liquid may be removed from the stage 114 and a second resin that is loaded with metal salt, and now in the same layer that was previously exposed, it is possible to print the complementary structure in the same layer, where the complementary structure is metalized. Subsequently, the second resin may be flushed from the stage 114, and the stage may be repositioned for forming a subsequent layer on the multi-material layer formed as set forth above.

In more embodiments, a single precursor bath may be used and include the metal salt and photoactive reduction inhibitor solvated in the photopolymer resin. Complementary regions of the resin may be exposed to two different profiles of light, a first profile including only a wavelength corresponding to the photoactivator and thus configured to cause the photopolymer to crosslink and form a three-dimensional layer of non-metallized material. The second profile may include both the wavelength corresponding to the photoactivator and a second, different wavelength corresponding to the photoactive reduction inhibitor, such that exposing the resin using the second light profile causes the photopolymer to crosslink as well as the metal ions therein to reduce, forming a metallized material. The region exposed to the first light profile may be complementary to the region exposed to the second light profile, in various approaches.

In various embodiments, method 500 may additionally and/or alternatively include one or more of the following operations and/or features.

In one embodiment, it is advantageous to iteratively repeat the curing and the selectively reducing to form the three dimensional structure in a layer-wise fashion. Each iteration forms a layer of the three-dimensional structure, or a portion of a layer (e.g. in the case of complementary printing as described above).

The selectively metallized three-dimensional structure may include metallized portions and non-metallized portions; and the metal may be present only on the surfaces of the structure, may be dispersed throughout a bulk of the metallized portions of the three-dimensional structure, or both, in several embodiments.

Moreover, curing the portions of the resin may include exposing the portions of the resin to light having a wavelength corresponding to an active wavelength of a photoinitiator in the resin; and the portions of the resin exposed to light having a wavelength corresponding to an active wavelength of a photoinitiator are defined according to a first digital mask.

As suggested above, selective metallization may include selectively preventing reduction of metal ions solvated in the resin by mixing a photoactive reduction inhibitor into the resin. Preferably, the photoactive reduction inhibitor is selected from a group consisting of a photo labile chelating agent and a photo reductant. For instance o-nitrophenyl-egtazic acid (o-nitrophenyl-EGTA) is a suitable chelating agent. Of course, other photo labile chelating agents and/or photo reductants may be utilized, including any suitable chelating agent and/or photo reductants that would be understood by a person having ordinary skill in the art as suitable in the context of the wavelengths of light to be used and the materials to be used in the fabrication process.

In more embodiments, selectively reducing the metal ions may include exposing the photoactive reduction inhibitor to light in predetermined portions of the resin, the light having a wavelength that deactivates a photoactive reduction inhibitor. The predetermined portions of the resin exposed to the light in order to deactivate the photoactive reduction inhibitor preferably include at least some of the portions of the resin cured to form the three-dimensional structure.

In some approaches, the wavelength that deactivates reduction inhibiting properties of the photoactive reduction inhibitor is different than a wavelength of light to which the resin is exposed in order to cure the resin.

Additionally and/or alternatively, a specific wavelength of light may activate a photoreductant to facilitate the selective reduction of metal ions and incorporation into the three dimensional structure formed during the fabrication process.

Moreover, during selective metallization the predetermined portions of the resin exposed to the light in order to deactivate the photoactive reduction inhibitor and/or activate a photo reductant may be defined according to a second digital mask. Preferably, curing portions of the resin and the selectively reducing the metal ions are performed in a single exposure.

Figure 1B:
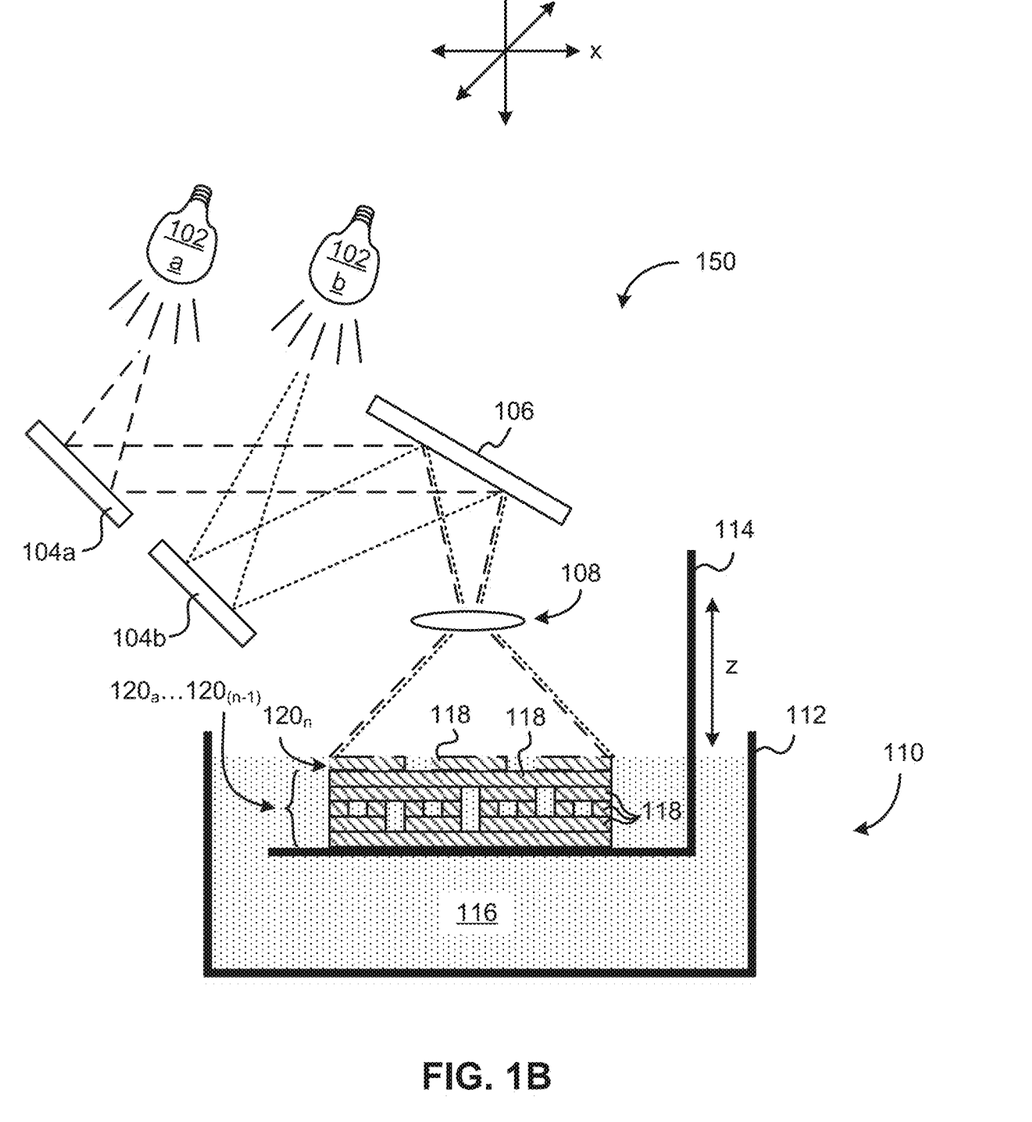
FIG. 1B is a simplified schematic of an exemplary conventional PμSL system having two light sources and configured to simultaneously expose portions of a precursor bath to different wavelengths of light.

According to such embodiments, and with reference to FIG. 1B, an apparatus 150 substantially similar to the apparatus 100 depicted in FIG. 1A may be utilized. The apparatus may, however, further include a first light source 102a and a second light source 102b each configured to emit light, preferably monochromatic light. Most preferably, the wavelength of the light emitted from the second light source 102b is different than the wavelength of light emitted from light source 102a.

Light emitted from first light source 102a may have a wavelength configured to cure the photopolymers in the precursor 116 and facilitate formation of a three dimensional structure, while light emitted from second light source 102a may have a wavelength configured to activate a photo reductant and/or deactivate a photoactive reduction inhibitor and convert metal ions to metals for incorporation into the three dimensional structure during formation thereof. Of course, the function of light emitted by light sources 102a and 102b may be reversed, and/or may function according to any other photoactivation process referred to herein, in various embodiments.

The apparatus 150 may also preferably include a first and second (e.g. digital) photomask 104a, 104b, and a beam splitter or other suitable diffraction mechanism (not shown) configured to facilitate simultaneous imaging of both the first and second masks onto a build plane of the apparatus.

Otherwise, the apparatus 150 may be substantially identical or include substantially all components and features as described herein with respect to apparatus 100 and shown in FIG. 1A. Of course, those having ordinary skill in the art will appreciate that the exemplary apparatus setups shown in FIGS. 1A-1B and corresponding descriptions are merely exemplary implementations, and should not be considered limiting on the scope of the present disclosures. Other suitable setups that would be understood by skilled artisans as suitable upon reading the instant descriptions may also be employed without departing from the scope of the inventive concepts presented herein.

Applications/Uses

Embodiments of the present invention may be used in a wide variety of applications, particularly additive manufacturing techniques such as PµSL, binder printing, deposition modeling, stereolithography, or any other suitable additive manufacturing or 3D-printing application that would be understood by a person having ordinary skill in the art upon reading the present disclosure.

While particularly advantageous in the context of PµSL as described hereinabove, in principle the presently disclosed inventive techniques may be applied to other additive manufacturing and/or 3D-printing techniques essentially by introducing metal salts into a bulk material used for manufacturing the resulting structure.

In one embodiment, conventional stereolithography techniques may be employed for manufacturing the structure. Inclusion of metal salts in the precursor material may be accomplished substantially as described herein for techniques employing PµSL, and subsequent reduction of such metal salts may accomplish selective metallization of the final structure.

In the case of binder printing, metal salts may be included in one of the binder compositions such that metal-containing and metal-omitting binder may be selectively deposited according to a desired pattern or spatial arrangement defining locations where metal should be included in the final product.

In the case of deposition modeling, a multi-material print/extrusion head may be employed and one material may include metal salt, while other material(s) may not. Similarly, metal-containing and metal-omitting materials may be selectively printed/extruded according to a desired pattern or spatial arrangement defining locations where metal should be included in the final product. Regardless of the particular manufacturing/printing process employed, reduction of the metal salts may accomplish the final metallization, using any technique described herein.

In embodiments where multi-material printing is employed, e.g. selective metallization as discussed above regarding FIG. 5, the three dimensional structures may be fabricated with custom geometries, and portions of the structures may be metallized while others are not metallized. Metallization conveys special electromagnetic properties to the resulting structure, enabling formation of structures suitable for use as three-dimensional antennas in unconventional or conventional arrangements, circuits, etc. as would be understood by a person having ordinary skill in the art upon reading the present disclosures.

In more approaches, structures having specific mechanical properties, e.g. designed to be very lightweight, to be stiff, etc. may be fabricated.

For instance, it is possible to fabricate different elements of circuits, for example, electrodes, resistors, and so forth, and those can be based off of metals, possibly. In more approaches, insulators such as dielectrics may be similarly included using suitable precursor salts in conjunction with the presently disclosed inventive techniques. Such salts may include any suitable precursor for forming a dielectric, as would be understood by a person having ordinary skill in the art upon reading the present disclosures.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In particular, in various embodiments portions of methods 300-500 may include any feature or operation disclosed in connection with the other methods disclosed herein.

In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A three-dimensional structure, comprising:
   at least one crosslinked photopolymer in a metallized first portion of the structure and a non-metallized second portion of the structure,
   wherein the structure is characterized by:
      having at least one metal dispersed throughout the metallized first portion of the structure and a salt of the metal in the non-metallized second portion of the structure; and
      comprising features having a horizontal and/or vertical feature resolution in a range from several hundred nanometers to several hundred microns.

2. The structure as recited in claim 1, wherein the metal comprises gold.

3. The structure as recited in claim 1, wherein the structure comprises a plurality of layers of the at least one crosslinked photopolymer, each layer having a thickness in a range from about 10 nm to about 500 µm.

4. The structure as recited in claim 1, wherein the metallized first portion of the structure throughout which the metal is dispersed comprises a continuous pathway defining a circuit, wherein the continuous pathway is conductive.

5. A method for forming a three-dimensional structure, the method comprising:
   curing a first photopolymeric resin using projection microstereolithography (PµSL) for forming a first section of a three-dimensional structure, the first section having solely polymer;
   dissolving at least one metal salt in a second resin comprising one or more photopolymers;
   curing portions of the second resin using projection microstereolithography (PµSL) to form a second section of the three-dimensional structure on the first section, the second section having therein the at least one metal salt; and
   reducing metal ions within the three-dimensional structure to form the three-dimensional metallized structure, wherein metal is dispersed throughout a bulk of the second section of the three-dimensional structure.

6. The method as recited in claim 5, wherein the reducing comprises chemical reduction.

7. A method for forming a three-dimensional structure having at least one metal plated thereon, the method comprising:
dissolving at least one metal salt in a resin comprising one or more photopolymers and a hydrogel ink;
curing portions of the resin to form the three-dimensional structure; and
electroless plating at least one metal directly onto surfaces of the three-dimensional structure.

8. The method as recited in claim 7, wherein the one or more photopolymers comprise at least one photopolymer selected from the group consisting of: hexane diol diacrylate (HDDA); polyethylene glycol diacrylate (PEGDA); ethylene glycol dimethacrylate (EGDMA); thiol-ene; and silicones.

9. The method as recited in claim 7, comprising utilizing metal ions incorporated in the surfaces of the three-dimensional structure as catalysts for the electroless plating.

10. The method as recited in claim 7, further comprising etching away polymeric regions of the three-dimensional structure to form a hollow metal part.

11. A method for forming a selectively metallized three-dimensional structure, the method comprising:
dissolving at least one metal salt in a resin comprising one or more photopolymers;
curing first portions of the resin by exposing the first portions of the resin to a first profile of light to form non-metallized, crosslinked portions of a three-dimensional structure; and
selectively reducing metal ions in second portions of the resin by exposing the metal ions and the second portions of the resin to a second profile of light to form metallized, crosslinked portions of the three-dimensional structure.

12. The method as recited in claim 11, comprising iteratively repeating the curing and the selectively reducing, wherein each iteration forms a layer of the three-dimensional structure.

13. The method as recited in claim 11, wherein curing the portions of the resin comprises exposing the portions of the resin to light having a wavelength corresponding to an active wavelength of a photoinitiator in the resin; and
wherein the portions of the resin are defined according to a first digital mask, the first digital mask comprising an array of micromirrors and/or a liquid crystal on silicon (LCoS) device.

14. The method as recited in claim 11, comprising selectively preventing reduction of metal ions solvated in the resin by mixing a photoactive reduction inhibitor into the resin.

15. The method as recited in claim 14, wherein the photoactive reduction inhibitor comprises o-nitrophenyl-egtazic acid (o-nitrophenyl-EGTA).

16. The method as recited in claim 11, wherein the first profile of light comprises first light having a wavelength that causes the one or more photopolymers to crosslink upon exposure thereto; and wherein the second profile of light comprises:
the first light; and
second light having a wavelength that causes the metal ions to reduce into metal upon exposure thereto.

17. The method as recited in claim 11, wherein the resin further comprises a hydrogel ink.

18. The method as recited in claim 11, wherein the curing and the selectively reducing are performed in a single exposure.

* * * * *